US008527876B2

(12) United States Patent
Wood et al.

(10) Patent No.: US 8,527,876 B2
(45) Date of Patent: Sep. 3, 2013

(54) SYSTEM AND METHODS FOR ADJUSTING GRAPHICAL REPRESENTATIONS OF MEDIA FILES BASED ON PREVIOUS USAGE

(75) Inventors: Policarpo Wood, Cupertino, CA (US); Benjamin Andrew Rottler, Burlingame, CA (US); Kourtny Minh Hicks, Sunnyvale, CA (US); Eric James Hope, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 851 days.

(21) Appl. No.: 12/157,849

(22) Filed: Jun. 12, 2008

(65) Prior Publication Data
US 2009/0313544 A1 Dec. 17, 2009

(51) Int. Cl.
*G06F 3/00* (2006.01)

(52) U.S. Cl.
USPC ........... 715/716; 715/744; 715/745; 715/789; 375/354; 381/103; 84/609

(58) Field of Classification Search
USPC .......................... 715/716, 789, 811, 745, 866
See application file for complete search history.

(56) References Cited

U.S. PATENT DOCUMENTS

| | | | | |
|---|---|---|---|---|
| 5,751,672 A | * | 5/1998 | Yankowski | 709/238 |
| 5,987,525 A | * | 11/1999 | Roberts et al. | 709/248 |
| 6,118,450 A | * | 9/2000 | Proehl et al. | 715/810 |
| 6,243,725 B1 | * | 6/2001 | Hempleman et al. | 715/210 |
| 6,526,411 B1 | * | 2/2003 | Ward | 1/1 |
| 6,545,209 B1 | * | 4/2003 | Flannery et al. | 84/609 |
| 6,707,476 B1 | * | 3/2004 | Hochstedler | 715/789 |
| 7,343,561 B1 | * | 3/2008 | Stochosky et al. | 715/758 |
| 7,523,191 B1 | * | 4/2009 | Thomas et al. | 709/224 |
| 7,571,014 B1 | * | 8/2009 | Lambourne et al. | 700/94 |
| 7,774,520 B2 | * | 8/2010 | Hanebutte et al. | 710/52 |
| 7,779,014 B2 | * | 8/2010 | York et al. | 707/748 |
| 2002/0174230 A1 | * | 11/2002 | Gudorf et al. | 709/227 |
| 2004/0056901 A1 | * | 3/2004 | March et al. | 345/811 |
| 2004/0264917 A1 | * | 12/2004 | Braun et al. | 386/46 |
| 2004/0267693 A1 | * | 12/2004 | Lowe et al. | 707/1 |

(Continued)

FOREIGN PATENT DOCUMENTS

| | | |
|---|---|---|
| JP | 2005-136635 | 5/2005 |
| WO | 2007144030 A1 | 12/2007 |

OTHER PUBLICATIONS

U.S. Appl. No. 60/955,474 Provisional Application to Kuzmanovic, Usage Pattern Driven Graphical User Interface Element Rendering, filed Aug. 13, 2007.*

*Primary Examiner* — William Bashore
*Assistant Examiner* — Reza Nabi
(74) *Attorney, Agent, or Firm* — Kilpatrick Townsend & Stockton LLP

(57) ABSTRACT

Systems and methods for adjusting playback and graphical representations of media files are provided. The systems and methods can monitor playback and access of media files to create usage metadata. The usage metadata can then be used to adjust the playback of the media file. For example, the usage metadata may indicate that a user skips, on average, the first 22 seconds of a particular song so the next time that song is played, the first 22 seconds will automatically be skipped. The usage metadata can additionally or alternatively be used to adjust a graphical representation of the media file. For example, the usage metadata may indicate that a user rarely accesses a particular song so the graphical representation of that song will be small and faded. This change in graphical representation can help a user find more commonly used media files.

24 Claims, 10 Drawing Sheets

(56) References Cited

U.S. PATENT DOCUMENTS

| | | | |
|---|---|---|---|
| 2005/0097618 A1* | 5/2005 | Arling et al. | 725/114 |
| 2005/0216855 A1* | 9/2005 | Kopra et al. | 715/767 |
| 2006/0048060 A1* | 3/2006 | Mohr et al. | 715/747 |
| 2006/0230170 A1* | 10/2006 | Chintala et al. | 709/231 |
| 2006/0242178 A1* | 10/2006 | Butterfield et al. | 707/100 |
| 2006/0288845 A1* | 12/2006 | Gale | 84/609 |
| 2007/0011616 A1* | 1/2007 | Ording et al. | 715/738 |
| 2007/0130012 A1* | 6/2007 | Yruski et al. | 705/14 |
| 2008/0002839 A1* | 1/2008 | Eng | 381/103 |
| 2008/0034039 A1* | 2/2008 | Cisler et al. | 709/204 |
| 2008/0059894 A1* | 3/2008 | Cisler et al. | 715/762 |
| 2008/0126442 A1* | 5/2008 | Cisler et al. | 707/204 |
| 2008/0162358 A1* | 7/2008 | Patsiokas et al. | 705/57 |
| 2008/0165906 A1* | 7/2008 | Ho et al. | 375/354 |
| 2008/0222546 A1* | 9/2008 | Mudd et al. | 715/765 |
| 2008/0250319 A1* | 10/2008 | Lee et al. | 715/716 |
| 2009/0047993 A1* | 2/2009 | Vasa | 455/556.1 |
| 2009/0049389 A1* | 2/2009 | Kuzmanovic | 715/745 |
| 2009/0063975 A1* | 3/2009 | Bull et al. | 715/716 |
| 2009/0070370 A1* | 3/2009 | Cunningham et al. | 707/104.1 |
| 2009/0100068 A1* | 4/2009 | Gauba et al. | 707/10 |
| 2009/0111487 A1* | 4/2009 | Scheibe | 455/456.6 |
| 2009/0125571 A1* | 5/2009 | Kiilerich et al. | 707/204 |
| 2009/0125609 A1* | 5/2009 | Wood et al. | 709/219 |
| 2009/0158155 A1* | 6/2009 | Quinn et al. | 715/716 |
| 2009/0313564 A1* | 12/2009 | Rottler et al. | 715/764 |
| 2009/0326949 A1* | 12/2009 | Douthitt et al. | 704/260 |
| 2010/0131844 A1* | 5/2010 | Wohlert | 715/716 |
| 2010/0229082 A1* | 9/2010 | Karmarkar et al. | 715/205 |
| 2010/0250341 A1* | 9/2010 | Hauser | 705/10 |
| 2011/0106799 A1* | 5/2011 | Barkai et al. | 707/732 |
| 2011/0190035 A1* | 8/2011 | Vanden Heuvel et al. | 455/566 |

\* cited by examiner

| | Name | Artist | Album | Starting Point | Ending Point | Volume | Equalizer Setting | Play Count | Last Played |
|---|---|---|---|---|---|---|---|---|---|
| 810 | | | | | | | | | |
| 820 | Paint It, Black | The Rolling Stones | Aftermath | 0:00 | 3:22 | 65% | Rock | 1 | 6/20/07 10:03 AM |
| 830 | Miss You | The Rolling Stones | Some Girls | 0:14 | 4:20 | 63% | Rock | 8 | 2/13/08 6:42 PM |
| 840 | Beast of Burden | The Rolling Stones | Some Girls | 0:00 | 4:02 | 70% | Rock | 3 | 8/3/07 2:39 PM |
| 850 | Satisfaction | The Rolling Stones | Out of Our Heads | 0:00 | 3:44 | 88% | Rock | 7 | 3/19/08 7:16 AM |
| 860 | Time Is on My Side (live) | The Rolling Stones | Still Life | 0:00 | 2:58 | 68% | Rock | 12 | 4/9/08 8:28 PM |

FIG. 8

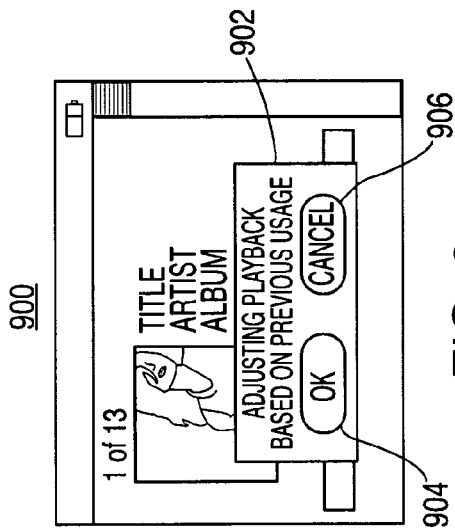

FIG. 9

SYSTEM AND METHODS FOR ADJUSTING GRAPHICAL REPRESENTATIONS OF MEDIA FILES BASED ON PREVIOUS USAGE

BACKGROUND OF THE INVENTION

The present invention relates to electronic devices that play digital media files. More particularly, the present invention relates to systems, methods and computer readable media for adjusting the playback or display of media files based on previous usage history.

Electronic devices (e.g., digital media players) that play media files (e.g., song or video files) are known. Existing devices display available files in a list such that a user can manually select a file for playback. After one file finishes playing, the existing devices will then start playing the beginning of the next file in the list.

Such existing devices are deficient for a number of reasons. For example, if a user wishes to start playing a file at a point different from the beginning (e.g., cueing), the user must manually select that point each time that the file is played. As another example of the deficiencies in existing devices, the number of available files in such electronic devices can increase to the point where it is confusing and distracting for a user to navigate a listing of available files. Accordingly, it would be desirable to provide methods, systems and computer readable media for adjusting the playback or display of media files based on the history of previous access.

SUMMARY OF THE INVENTION

Systems and methods for adjusting playback and graphical representations of media files are provided. The systems and methods can monitor playback and access of media files to create usage metadata. In some embodiments, the usage metadata can then be used to adjust the playback of the media file. For example, the usage metadata may indicate that a user skips, on average, the first 22 seconds of a particular song so the next time that song is played, the first 22 seconds will automatically be skipped. In some embodiments, the usage metadata can additionally or alternatively be used to adjust a graphical representation of the media file. For example, the usage metadata may indicate that a user rarely accesses a particular song so the graphical representation of that song will be small and faded. This change in graphical representation can help a user find more commonly used media files.

A method for adjusting a graphical representation of a media file can include monitoring access history of the media file, storing usage metadata based on the monitoring, and adjusting the graphical representation of the media file based on the stored usage metadata. In some embodiments, the graphical representations can be a listing. The adjusting of the listing can include changing the font size of the listing, changing the font intensity of the listing or changing the color of the listing. In some embodiments, the graphical representation can be an image. The adjusting can include changing the size of the image or changing a three-dimensional rendering of the image (e.g., changing a simulated depth of the image). The access history can indicate the number of times that a media file has been played. The access history can indicate the number of times that more than a particular amount of a media file (e.g., a percentage of the total length of the file) has been played. The method can also include computing new usage metadata based on previously stored usage metadata. The computing can include averaging previously stored usage metadata with results from the monitoring.

In some embodiments, a threshold can be used to determine when to adjust a graphical representation based on usage metadata. For example, a method for adjusting a graphical representation of a media file based on usage metadata can include receiving a user input indicating an adjustment threshold, determining that the usage metadata associated with the file is over the threshold, and adjusting a graphical representation of the file based on the usage metadata in response to the determining. The method can further include determining that the usage metadata associated with the file is not over the threshold and displaying an unadjusted media file in response to the determining that the usage metadata associated with the file is not over the threshold. The adjusted graphical representation can be less noticeable than an unadjusted graphical representation when the usage metadata indicates infrequent use, and the adjusted graphical representation can be more noticeable than an unadjusted graphical representation when the usage metadata indicates frequent use.

A device for adjusting a graphical representation of a media file is provided. The device can include storage operative to store media files and usage metadata associated with each media file. The device can also include a processor coupled to the storage. The processor can adjust a graphical representation of a media file based on the usage metadata. The device can be a portable battery-powered device. The processor can monitor access history of the media file and direct the storage to store the results as usage metadata. The device can also include a display. The display can display an adjusted graphical representation. The device can also include communications circuitry operative to receive usage metadata from a host device. The processor can synchronize the received usage metadata with the stored usage metadata.

A system for adjusting a graphical representation of a media file is provided. The system can include a portable device with storage, a processor and communications circuitry. The portable device's storage can store media files and a first instance of usage metadata. The portable device's processor can adjust a graphical representation of the media file based on the first usage metadata. The portable device's communications circuitry can communicate with a host device. The system can also include a host device with storage, a processor and communications circuitry. The portable device's storage can store media files and a second instance of usage metadata. The portable device's processor can adjust a graphical representation of the media file based on the second usage metadata. The portable device's communications circuitry can communicate with the portable device. At least one of the processors can synchronize the first and second usage metadata. The first and second usage metadata can be synchronized by combining the first and second usage metadata to create new usage metadata. The first and second usage metadata can be synchronized by keeping recent usage metadata and deleting older usage metadata. The first and second usage metadata can be synchronized by averaging the first in second usage metadata.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 8 shows a schematic view of an illustrative data structure for storing metadata in accordance with an embodiment of the present invention;

FIG. 9 shows a schematic view of an illustrative display screen for notifying a user of a playback adjustment in accordance with an embodiment of the present invention;

DETAILED DESCRIPTION OF THE INVENTION

Figure 1:
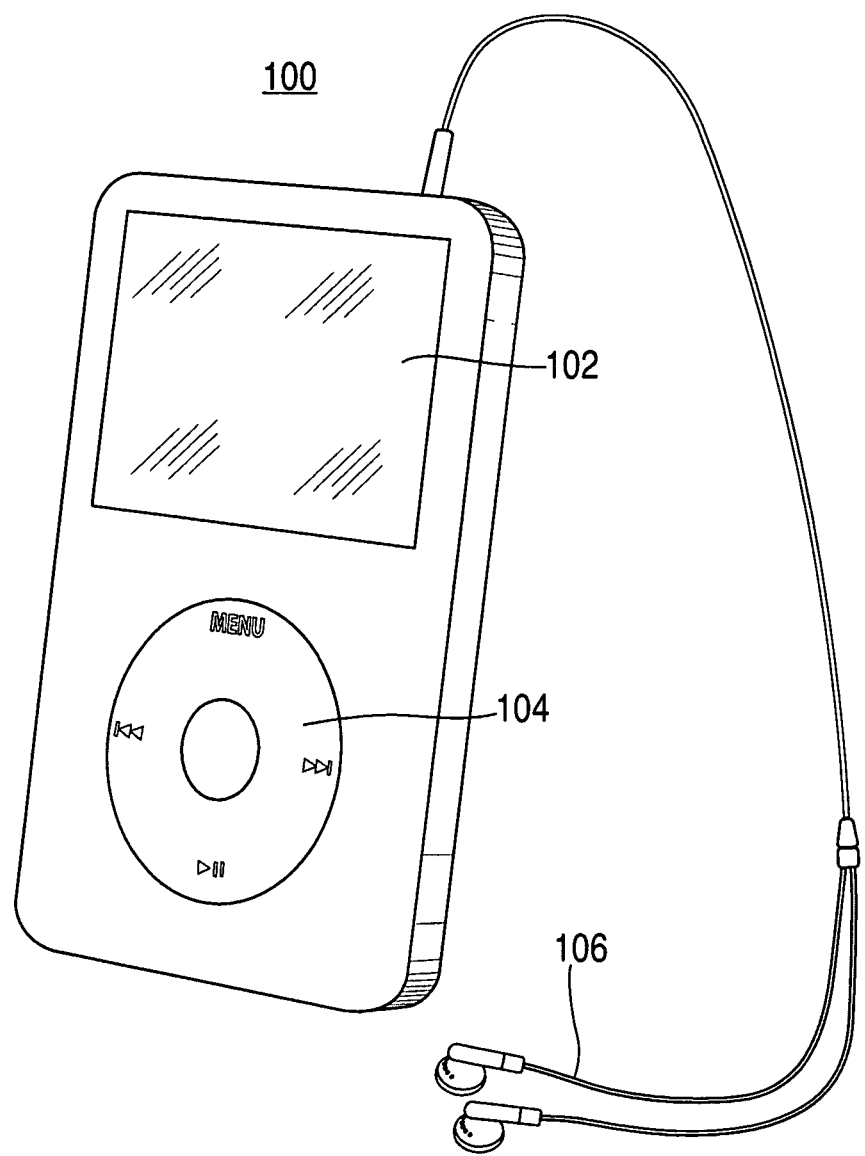
FIG. 1 shows a simplified diagram of an electronic device which can be operated in accordance with an embodiment of the present invention.

FIG. 1 shows a simplified diagram of an electronic device which can be operated in accordance with an embodiment of the present invention. Electronic device 100 can include display component 102, user input component 104, and accessory device 106.

Display component 102 is illustrated in FIG. 1 as a display screen that is integrated into electronic device 100. In some embodiments, display component 102 is not necessarily integrated into electronic device 100 and may be external to electronic device 100. For example, display component 102 can be a computer monitor, television screen, and/or any other graphical user interface, textual user interface, or combination thereof. Display component 102 can enable a user to see images (moving and still) played by electronic device 100, display interactive user menus, and/or be used for any other display-related purpose. The images displayed by display component 102 may be the content of media files (e.g., videos) or images associated with media files (e.g., album art).

User input component 104 is illustrated in FIG. 1 as a click wheel. One skilled in the art can appreciate that user input component 104 may also be any other type of user input component or device, such as, for example, a mouse, keyboard, trackball, slider bar, one or more buttons, electronic device pad, dial, or any combination thereof. User input component 104 may also include a multi-touch screen or other touch-activated component such as that described in Westerman et al., U.S. Pat. No. 6,323,846, entitled "Method and Apparatus for Integrating Manual Input," which is incorporated by reference herein in its entirety. User input component 104 can emulate a rotary phone or a multi-button electronic device pad (e.g., on a touch screen or the combination of a click wheel or other user input device and a screen). A more detailed discussion of such a rotary phone interface may be found, for example, in McKillop et al., U.S. patent application Ser. No. 11/591,752 entitled "Touch Pad with Symbols based on Mode," which is incorporated by reference herein in its entirety.

Accessory device 106 can be used to facilitate the playback of audio content and/or the audio portion of video content to the user. Accessory device 106 can be coupled to electronic device 100 using a headphone jack. Any suitable audio output device can be used as accessory device 106, such as, for example, a speaker integrated into electronic device 100, or an external device such as one or more external speakers. Persons skilled in the art can appreciate that accessory device 106 may be wirelessly coupled to electronic device 100.

Figure 2:
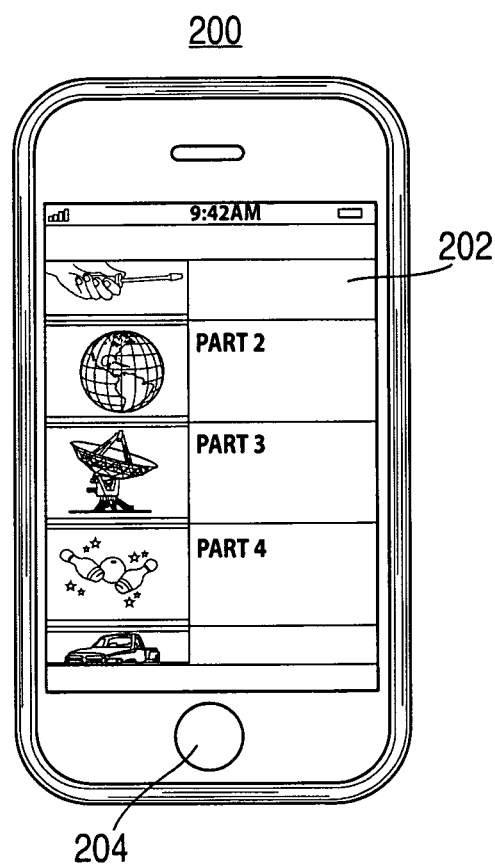
FIG. 2 shows a simplified diagram of an electronic device which can also be used in accordance with an embodiment of the present invention.

FIG. 2 shows a simplified diagram of an electronic device which can function in accordance with an embodiment of the present invention. Electronic device 200 can be any electronic device, but is shown in FIG. 2 as an iPhone™. Electronic device 200 can function as, for example, a portable media player, cellular telephone, personal organizer or any other handheld device. Electronic device 200 can be an electronic device that receives, stores and plays back media files (e.g., audio files, video files, digital image files, and/or any other type of media files). It is understood that a slideshow composed of multiple images is a media file in accordance with the principles of the present invention.

Electronic device 200 can also function as a communications device. For example, device 200 may facilitate telephone calls, send and receive electronic messages (such as, e.g., text and e-mail messages), communicate with satellites (e.g., to provide driving directions or radio programming), and/or communicate with any other type of device or server in any manner. Electronic device 200 can be, for example, a multi-touch hybrid device that has a display screen (like the iPhone™) or any other type of electronic device.

Electronic device 200 can comprise user interface component 202. User interface component 202 is shown in FIG. 2 as a multi-touch screen that can function as both an integrated display screen and user input device. User interface component 202 can generate various touch signals in response to different touch events. A touch event occurs when a pointing apparatus, such as a user's fingertip or stylus, makes physical contact with, disengages from or moves along user interface component 202. A more detailed discussion of such a multi-touch screen may be found, for example, in Hotelling et al., U.S. Patent Publication No. 2006/0097991, entitled "Multipoint Touchscreen," which is incorporated by reference herein in its entirety.

Touch events can differ depending on, for example, the type of motion made by the pointing apparatus, the relative location of the touch event, the relative timing of the touch event in relation to other touch events or some combination of these factors. In addition, user interface component 202 can be used for entry of, for example, text messages via letter-by-letter handwriting recognition. In some embodiments, electronic device 200 can announce to the user which letter the user has written (e.g., through user interface component 202, a speaker component, a headphone device or some combination of these components).

In some embodiments, electronic device 200 can include button 204, which can be used in conjunction with user interface component 202.

In some embodiments, an electronic device (e.g., device 100 or device 200) can include one or more connector components, such as, for example, a 30-pin connector or a headset connector. A 30-pin connector can be used, for example, to couple an electronic device to an accessory device, host device, external power source, and/or any other electronic device. A host device may be, for example, a desktop or laptop computer or data server from which the electronic device can receive media files.

An electronic device (e.g., device 100 or 200) can include a connector for physically and electrically coupling the device and an accessory device together. An accessory device can include, for example, speakers that serve as headphones. The speakers can enable the user to hear audio files that are played by the electronic device. In some embodiments, an accessory device can also include a microphone. The microphone can allow the user to provide voice commands to the electronic device, have a telephone conversation, or perform any other activity that requires audio input. Persons skilled in the art can appreciate that an accessory device can also be wirelessly coupled to an electronic device.

Figure 3:
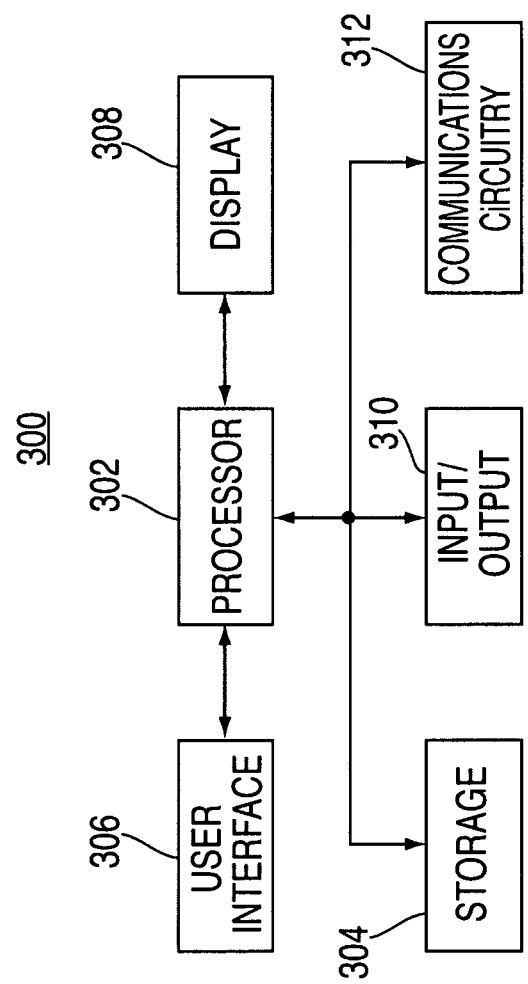
FIG. 3 shows a simplified block diagram of circuitry that can be included in an electronic device in accordance with an embodiment of the present invention.

FIG. 3 shows a simplified block diagram of circuitry that can be included in an electronic device in accordance with an embodiment of the present invention. Electronic device 300 can include, for example processor 302, storage 304, user interface circuitry 306, display circuitry 308, input/output circuitry 310 and communications circuitry 312. In some embodiments, electronic device 300 can include more than one of each component, but for the sake of illustration, only one of each is shown in FIG. 3. In addition, one skilled in the art can appreciate that the functionality of certain components can be combined, interchanged, and/or omitted and that additional components, which are not shown in FIG. 3, can be included in electronic device 300. One skilled in the art can also appreciate that all of the components can be integrated into electronic device 300, or one or more of the components can be provided externally or remotely. Electronic device 300 can be implemented as any type of electronic device, such as, for example electronic devices 100 and 200 discussed above.

Processor 302 can include circuitry for and be configured to perform any function. For example, processor 302 may be used to run operating system applications, media playback applications, media editing applications, and/or any other application. Processor 302 may drive display circuitry 308 and may receive user inputs from user interface circuitry 306.

Storage 304 can include one or more different types of memory or storage mediums which can be used to facilitate and/or perform various device functions. For example, storage 304 can include cache, flash, one or more different types of memory used for temporarily storing data, hard-drive, tape drive, optical drive, permanent memory such as ROM, semipermanent memory such as RAM, any other suitable type of storage component, or any combination thereof. A portion of storage 304 can be specifically dedicated to storing firmware. For example, a portion of storage 304 can be provided for storing firmware for device applications (e.g., operating system, user interface functions, and processor functions). Storage 304 can also store, for example, media files (e.g., music files, video files or image files), metadata files, application data files (e.g., for implementing functions on the device), preference information data files (e.g., media playback preferences), lifestyle information data files (e.g., food preferences), exercise information data files (e.g., information obtained by exercise monitoring equipment), transaction information data files (e.g., information such as credit card information), wireless connection information data files (e.g., information that may enable the device to establish a wireless connection), subscription information data files (e.g., information related to podcasts, television shows or other media a user subscribes to), contact information data files (e.g., telephone numbers and email addresses), calendar information data files, any other suitable data files or any combination thereof. Storage 304 can store programs or applications that can be run on processor 302, can maintain files formatted to be read and edited by one or more of the applications and can store any additional files that may aid the operation of one or more applications (e.g., metadata).

User interface circuitry 306 can convert user interactions into electrical signals that can be used by electronic device 300. For example, user interface circuitry 306 can receive various inputs from one or more input devices, such as at least a button, keypad, dial, click wheel, touch screen or any combination thereof, and can generate electric signals in response to receiving the inputs.

Display circuitry 308 can be used to present media information on a display component (e.g., display component 102 or interface component 202). Such media information may be textual, graphical or a combination thereof. Examples of media information that can be presented in accordance with the present invention are discussed, among other places, in connection with FIGS. 4-7 and 9-11. Display circuitry 308 can include a coder/decoder (CODEC) to convert digital data, including portions of media data files, into analog signals. Display circuitry 308 can include display driver circuitry and/or circuitry for controlling one or more display drivers.

Processor 302 or display circuitry 308 can generate display signals that provide media information or metadata related to media files. The media information or metadata may be received from communications circuitry 312, storage 304 or any other component of electronic device 300. In some embodiments, display circuitry 308, like any other component discussed herein, can be integrated within or externally coupled to electronic device 300.

Input/output circuitry 310 can convert electrical signals (e.g., physical contact inputs or analog audio signals) into digital data, and vice-versa. If necessary, input/output circuitry 310 can encode or decode while it converts from analog to digital or vice-versa. For use with input/output circuitry 310, digital data can be provided to and received from processor 302, storage 304, or any other component of electronic device 300. Although input/output circuitry 310 is illustrated in FIG. 3 as a single component of electronic device 300, any number of input/output circuitry can be included in electronic device 300 without deviating from the spirit and scope of the present invention. Input/output circuitry 310 can be used to interface with any input or output component or accessory, such as those discussed in connection with FIGS. 1 and 2. For example, electronic device 300 can include specialized input circuitry associated with input devices such as, for example, one or more microphones, cameras, proximity sensors, accelerometers, ambient light detectors, or any other suitable input device. Electronic device 300 can also include specialized output circuitry associated with output devices such as, for example, one or more speakers or any other suitable output device. It is understood that user interface circuitry 306 and display circuitry 308 are specific examples of input/output circuitry 310, but one or more additional input or output devices may also be provided as part of input/output circuitry 310.

Electronic device 300 can use communications circuitry 312 to communicate with one or more servers or other devices. Communications circuitry 312 may operate according to any suitable communications protocol. For example, communications circuitry 312 may support Wi-Fi (e.g., an 802.11x protocol), Ethernet, Bluetooth™ (which is a trademark owned by Bluetooth Sig, Inc.), high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other suitable communications protocol or any combination thereof.

Electronic device 300 can play media files to a user. In some embodiments, device 300 can be a dedicated media player (e.g., MP3 player). In other embodiments, this functionality may be combined with other functions. For example, device 300 can be a game player, remote controller, portable communications device or other suitable personal device that can also play media files. In some embodiments, electronic device 300 can be a portable device that provides media file playback, online access, and telephone functionality in a single integrated unit.

Electronic device 300 can be powered by a battery so as to make the device highly portable such that its functionality and value increases. In addition to being battery powered, electronic device 300 may be sized such that it fits relatively easily into a pocket or hand of a user. Electronic device 300 may be taken almost anywhere that a user travels because it is battery powered and relatively small.

Figure 4:
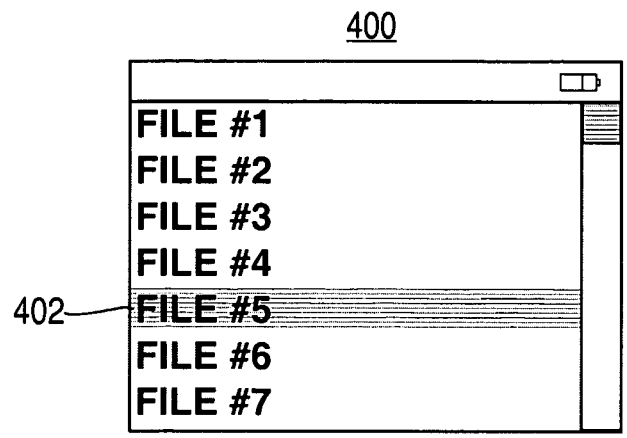
FIG. 4 shows a schematic view of an illustrative display screen for displaying graphical representations of media files in accordance with an embodiment of the present invention.

FIG. 4 shows a schematic view of an illustrative display screen for presenting a listing of media files to a user in accordance with an embodiment of the present invention. Display screen 400 can include a listing of all available media files or only the media files in a particular playlist. Display screen 400 may include cursor 402 such that the user can provide an input selecting one of the files. A user can operate the electronic device's user interface (e.g., user interface circuitry 306) to navigate cursor 402 to a desired media file (e.g., by moving a finger around a click wheel in user input component 104 of FIG. 1 or the touch screen in user interface component 202 of FIG. 2) and select that file (e.g., by touching the center select button in user input component 104 of FIG. 1 or selecting a play icon in user interface component 202 of FIG. 2). The electronic device can then play the selected file in response to receiving the user's selection.

Figure 5:
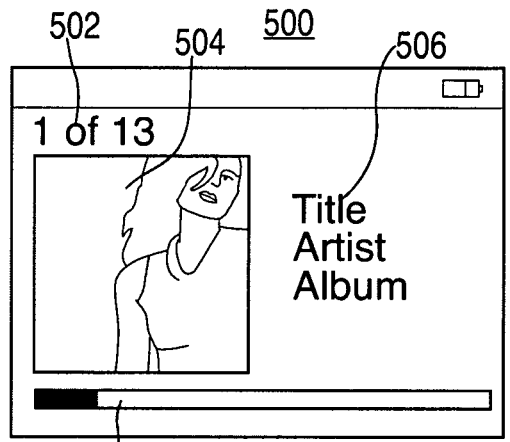
FIG. 5 shows a schematic view of an illustrative display screen for adjusting volume while playing a media file on an electronic device in accordance with an embodiment of the present invention.

FIG. 5 shows a schematic view of an illustrative display screen for adjusting volume while playing a media file on an electronic device in accordance with an embodiment of the present invention. Display screen 500 can be displayed when an electronic device is playing a media file. In some embodiments, the selected media file can be a member of a playlist. Playlists can be defined as a collection of one or more media files that can be organized in a particular order (e.g., alphabetically by title, artist, etc.). For example, a playlist can be defined by the user (e.g. "CLASSIC COUNTRY"). As another example, a playlist can include all of the available media files. As yet another example, a playlist can be predefined by the electronic device (e.g., songs in a music album or "My Top Rated" playlist).

In some embodiments, display screen 500 can include playlist information 502. For example, as displayed in FIG. 5, the currently playing media file is the first media file out of a total of thirteen media files in the playlist. In some embodiments, when the electronic device begins to play the second song in the playlist, playlist information 502 can be automatically updated. For example, the electronic device can display "2 of 13" in playlist information 502.

In some embodiments, display screen 500 can include graphical image 504, which can be an image that is associated with the media file. For example, graphical image 504 can be the album art from an album that includes the media file. In some embodiments, the user can use any suitable still or moving graphical image for image 504. In some embodiments, the electronic device can automatically download graphical image 504 from a server. For example, based on the media file's album, the electronic device can search a server for album art that is associated with the album and then download the album art as image 504 from the server. In some embodiments, image 504 may have previously been linked to the media file as metadata, so that as soon as a user adds the media file to the media library, graphical image 504 is automatically added as well.

In some embodiments, display screen 500 can include media file information 506. For example, media file information for a song can include the song's title, artist, and album. In some embodiments, graphical image 504, media file information 506, and any other suitable information can be associated with a media file as metadata. As a result, media files can be easily sorted using one or more types of metadata.

Display screen 500 can also include volume bar 508. In FIG. 5, volume bar 508 is a slider bar that displays the current volume, however any suitable representation of the current volume can be used. For example, a display screen can include a numerical display that shows volume as a percentage. In some embodiments, a user may adjust the volume by moving a finger around a click wheel (e.g., user input component 104). In other embodiments, a user may adjust the volume by sliding a finger across volume bar 508 on a touch screen component (e.g., sliding left to decrease volume and sliding right to increase volume).

In some embodiments, an electronic device can, in response to receiving a particular command, display a progress bar associated with the currently playing media file. For example, an electronic device can display the progress bar in response to a user pressing a center select button in a user input component (e.g., user input component 104) or selecting an option using a touch screen (e.g., user interface component 202). Persons skilled in the art can appreciate that display screens 500 to 700 do not necessarily need to be provided to the user in the order presented in FIGS. 5 to 7. For example, each of display screens 500 to 700 can be provided to a user without requiring the user to cycle through any of the other display screens.

Figure 6:
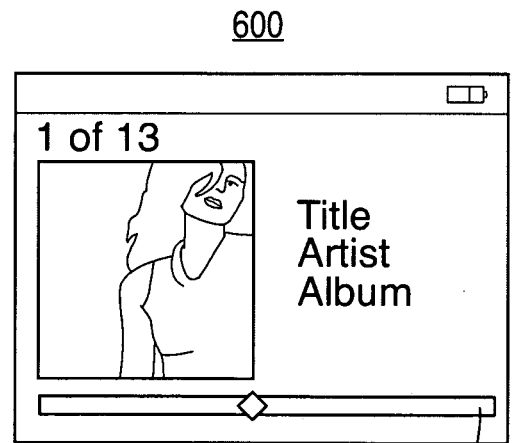
FIG. 6 shows a schematic view of an illustrative display screen for adjusting current playing progress in a media file in accordance with an embodiment of the present invention.

FIG. 6 shows a schematic view of an illustrative display screen for adjusting playback progress of a media file in accordance with an embodiment of the present invention. Display screen 600 can include progress bar 602. Progress bar 602 can display the playback progress of the media file. For example, as illustrated in FIG. 6, the playback progress is close to the middle of the media file. In some embodiments, such as the example shown in FIG. 6, progress bar 602 can be a slider bar. However, any suitable representation of the playback progress can be used, such as, for example, a numerical display that shows the playback progress as a counter of elapsed time or a percentage. In some embodiments, a user may adjust the playback progress (e.g., cueing) by providing a user input. For example, a user may move his finger around a click wheel in user input component 104 such that clockwise motions fast forward the media file (e.g., cueing) and counter clock-wise motions rewind the media file. In other embodiments, a user may slide his finger across progress bar 602 on a touch screen such that sliding right fast forwards the media file and sliding left rewinds the media file. In some embodiments, the electronic device can, in response to a user selecting to adjust playback progress, automatically begin to play the media file from the new position in the media file.

In accordance with the present invention, the electronic device can, in response to receiving a command, display a graphical image that is associated with the currently playing media file. For example, the electronic device can display an image after a user presses a center select button in user input component 104. In another example, the electronic device can display an image after a user selects an option using a touch screen in user interface component 202.

Figure 7:
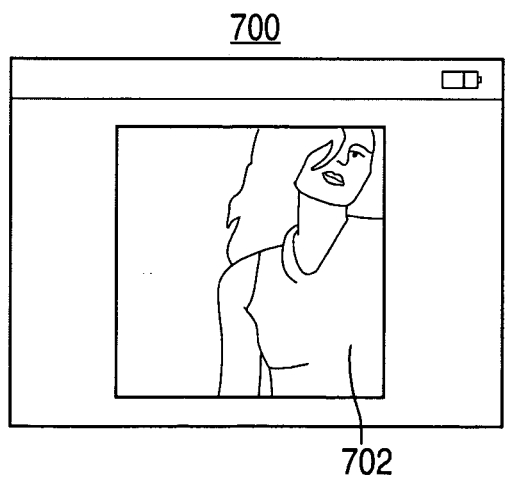
FIG. 7 shows a schematic view of an illustrative display screen for displaying a graphical image representing a media file in accordance with an embodiment of the present invention.

FIG. 7 shows a schematic view of an illustrative display screen for displaying a graphical image associated with a media file in accordance with an embodiment of the present invention. Display screen 700 can include graphical image 702. In some embodiments, image 702 can be similar to image 504 of FIG. 5 (e.g., album art or graphical image that is associated with the currently playing media file). For example, image 702 can be a larger and/or higher resolution version of image 504.

In accordance with an embodiment of the present invention, an electronic device may monitor the playback of a media file. The device may then store the results of this monitoring as usage metadata. Usage metadata differs from standard metadata in that usage metadata corresponds to the playback history of a media file while standard metadata corresponds to identification information (e.g., album, title, etc.) of a media file. As an example of usage metadata in accordance with an embodiments of the present invention, processor 302 of electronic device 300 may determine if a user adjusts playback progress to skip the beginning of a file (e.g., cueing) during playback and store usage metadata related to the playback (e.g., indicating the amount of the file that the user skipped) in storage 304. While the previous example described monitoring adjustments to playback progress or cueing, an electronic device can monitor any characteristic related to the playback of a media file without deviating from the spirit and scope of the present invention. For example, an electronic device can monitor if a user skipped the beginning of a file, if a user skipped the end of a file, if a user adjusted the volume during playback of a file, if a user adjusted the equalizer setting during playback of a file or if a user selects another file to play once playback of the file in question ends. In some embodiments, an electronic device may concurrently monitor multiple characteristics about the playback of a file.

In some embodiments, an electronic device may monitor the general access history of a media file and store the resulting usage metadata. Access history of a file may include any instance when the file is played or accessed. In some embodiments, playing a file may only qualify as accessing the file if more than a certain threshold is played (e.g., more than 10% of the file has been played). An electronic device can store a variety of access history measurements or statistics as usage metadata. For example, an electronic device may store usage metadata indicating the last time a file was accessed, the total number of times that a file has been accessed or any combination of access history measurements.

Usage metadata based on monitoring playback or access history may be stored in an electronic device. Usage metadata may be data that is associated with a particular media file. For example, metadata associated with a file may reflect one or more characteristics observed during playback or access history of that file. In some embodiments, the monitoring results from a single instance of file playback may be combined with existing usage metadata about that file to generate new usage metadata. For example, the monitoring results from a single instance of file playback may be averaged with the existing usage metadata associated with the file to create average metadata.

Usage metadata may be located within a media file or in a related data structure. In some embodiments, a media file may include sections of usage metadata. For example, a media file may include a header section reserved for usage metadata corresponding to that file. In some embodiments, an electronic device may include a data structure for storing usage metadata for more than one media file. In these embodiments, the usage metadata may be separate from the media files to which it corresponds.

FIG. 8 is a schematic display of an illustrative data structure in accordance with an embodiment of the present invention. Data structure 800 can include metadata about media files. Data structure 800 can include both usage and traditional metadata. Data structure 800 can be stored anywhere in the electronic device, such as storage 304.

Data structure 800 may be organized into a table having rows and columns. Each column in data structure 800 may be used to store values for different metadata. For example, column 801 may correspond to name metadata, column 802 may correspond to artist metadata and column 803 may correspond to album metadata. First row 810 in data structure 800 may include a set of names for the metadata that is represented by each column.

Each available media file may be represented by an entry (e.g., a row) in the data structure. For example, data structure 800 includes rows 820, 830, 840, 850 and 860 that are each an entry representing a media file. In data structure 800, all of the metadata in each row correspond to the media file represented by that row. For example, metadata 821-829 correspond to the media file represented by row 820. In the example shown in FIG. 8, the stored media file represented by row 820 has the name "Paint It, Black as indicated by the value 821 stored in the title metadata column 801.

Columns 801, 802 and 803 correspond to traditional identification metadata that may be used to identify or sort metadata. In accordance with the present invention, data structure 800 may include any number of traditional identification metadata for each media file. In some embodiments, data structure 800 may include pointers or storage addresses as metadata so that an electronic device can locate or retrieve the corresponding media file.

While columns 801, 802 and 803 correspond to traditional identification metadata, columns 804, 805, 806, 807, 808 and 809 correspond to usage metadata in accordance with an embodiment of the present invention. It is understood that any number of usage metadata can be stored in a data structure without deviating from the spirit and scope of the present invention.

Data structure 800 can include column 804 that corresponds to starting point metadata (e.g., the average amount of time that a user skips in the beginning of a media file). For example, if on average a user skips the beginning of a media file such that it starts playing at 0:23, that time may be the starting point metadata for that media file. In FIG. 8, metadata 835 indicates that, when playing "Miss You," a user skips the first 14 seconds of the song on average.

Data structure 800 can include column 805 that corresponds to ending point metadata (e.g., the average amount of time that user skips at the end of a media file). For example, if on average a user advances to the next media file once he has passed 4:09, that time may be the ending point metadata for that (first) media file. In the illustrative example, metadata 836 indicates that, when playing "Miss You," a user skips to another media file after 4:20 on average.

Data structure 800 can include column 806 that corresponds to volume metadata (e.g., the average volume that a user plays a media file). For example, metadata 856 indicates that the user plays "Satisfaction" at 88% volume.

Data structure 800 can include column 807 that corresponds to equalizer metadata (e.g., the equalizer setting that a user selects for playing a media file). For example, equalizer metadata can be an equalizer setting based on the type of music. In the example shown in FIG. 8, the equalizer metadata for all of the files is "Rock." In some embodiments, equalizer metadata can specify custom equalizer settings. For example, if a user customizes an equalizer (e.g., sets the frequency response for one or more bandwidths) during playback of a media file, a system can store the new equalizer settings as equalizer metadata.

Data structure 800 can include column 808 that corresponds to play count metadata (e.g., the number of times a user has played a media file). Data structure 800 may include column 809 that can correspond to last play metadata (e.g., the date and/or time that the media file was last played). It is understood that the play count metadata and last play metadata may be updated even if a user only plays a portion of a media file. For example, playback of more than a threshold (e.g., more than 10% of a media file), may be sufficient to update play count and last play metadata.

In some embodiments, usage metadata may include additional metadata other than the types shown in data structure 800. For example, usage metadata may include next file metadata (e.g., the media file that a user typically plays after the file in question). For some entries, the next file metadata may be null if a user hasn't deliberately skipped from one media file to another (e.g., the media file ends playing and the next media file is played automatically). In another example, usage metadata may include previous file metadata (e.g., the media file that a user typically plays before the file in question). For some entries, the previous file metadata may be null if a user hasn't deliberately skipped from another media file to the media file in question (e.g., the media file in question has only played automatically after another media file has finished playing). In yet another example, usage metadata may include graphic metadata (e.g., a pointer referencing the graphical image a user typically chooses to display during playback of the file). Graphic metadata may control the image displayed in graphical image 504 or graphical image 702 during playback.

In the example of data structure 800, only five media files are shown. However, any number of media files can be associated with a data structure in accordance with the present invention. Adding metadata for a new media file may be accomplished by inserting an additional row to data structure 800. In some embodiments, the process of adding a new entry to the data structure may be initiated when an electronic device plays a new media file for the first time. At that point, the device may generate metadata to store in the data structure. In some embodiments, an entry may be created in a data structure as soon as a media file is available, even if it has not been played. In such embodiments, usage metadata corresponding to each media file may be null until that media file is played.

Usage metadata in data structure 800 may be edited by an electronic device (e.g., device 100 or 200) or a host device (e.g., a personal computer that communicates with device 100 or 200). For example, an electronic device can edit usage metadata during media file playback such that usage metadata is adjusted to reflect the playback. In some embodiments, a host device can edit usage metadata in data structure 800 when a media file is played by the host device. For example, a host device can play media files and edit usage metadata based on the playback. In some embodiments, an electronic device can include an instance of data structure 800 while a host device can include another instance of data structure 800 such that when the two devices communicate, the two instances of data structure 800 may be synchronized (e.g., reconciled with each other) such that the usage metadata in each reflects media file playback in either the electronic device or the host device.

It is understood that data structure 800 is merely representative and that other suitable data structures can be used without deviating from the spirit and scope of the present invention. For example, a table, stack, queue, linked list, tree, graph or any other suitable type of data structure can be used to organize the values of attributes corresponding to stored program references.

It is understood that, in some embodiments, usage metadata may not be stored in a universal data structure. For example, metadata may be stored in the same data file as the associated media file in some embodiments. In other embodiments, a separate data structure or metadata file may be used for each media file.

FIG. 9 shows a schematic view of an illustrative display screen for displaying a notice regarding the adjustment of a playback characteristic in accordance with an embodiment of the present invention. In some embodiments, an electronic device may notify the user when a characteristic of file playback is adjusted based on stored usage metadata. In FIG. 9, display screen 900 is presenting the user with notice 902 which notifies the user that the playback of the media file is being adjusted based on stored usage metadata. For example, the device may be skipping the beginning of the file based on stored starting point metadata. An electronic device may give the user an option to intervene before the adjustment, during the adjustment or for a limited time period following the adjustment. For example, an electronic device may cue a file based on usage metadata and then, for a limited period of time, give the user an option to start from the beginning of the file. In the illustrative example shown in FIG. 9, notice 902 may include "OK" option 904 and "Cancel" option 906. A user may select "OK" option 904 to approve the adjustment (e.g., using user input component 104 or a touch screen), and notice 902 may subsequently disappear as the adjusted playback continues. If a user does not approve of the adjustment, the user may select "Cancel" option 906, and, the adjustment may be cancelled. In some embodiments, a notice may not provide an approval option and only provide a cancel option such that a user can approve of an adjustment by not providing input, and the notice will eventually disappear.

While notice 902 does not provide any particular details of the adjustment, it is understood that a notice can provide details regarding an adjustment based on usage metadata without deviating from the spirit and scope of the present invention. For example, a notice may include a detailed explanation of an adjustment or, if there are more than one adjustments, a detailed explanation of each adjustments. In some embodiments, a notice may provide a user with itemized options for approving or canceling each adjustment. In some embodiments, a notice may provide a user with itemized options for canceling each adjustment and each adjustment may be assumed to be accepted if the user does not select the cancel option.

In addition to or instead of adjusting playback, an electronic device may adjust how graphical representations of media files are displayed based on usage metadata. Graphical representations may include listings of the media file (e.g., display screen 400) or display of album art related to the media file (e.g., display screen 700). In some embodiments, an electronic device may adjust the font used to represent the file in a listing based on usage metadata. For example, a listing representing a file that is more commonly used may have a larger, bolder or brighter font than a listing of a less commonly used file. In some embodiments, representations of files that are used less often may be altered to be less noticeable. In some embodiments, representations of files that are used more often may be altered to be more noticeable. In some embodiments, representations of files may be altered such that less commonly used files are made less noticeable and more commonly used files are made more noticeable.

Figure 10:
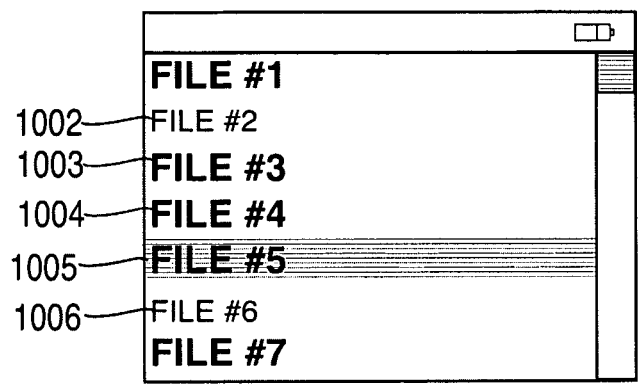
FIG. 10 shows a schematic view of an illustrative display screen for adjusting graphical representations of media files based on usage metadata in accordance with an embodiment of the present invention.

FIG. 10 shows a schematic view of an illustrative display screen for displaying graphical representations of media files in accordance with an embodiment of the present invention. In this illustration, display screen 1000 is showing graphical representations of media files where the listings of less commonly used files have been adjusted to be less noticeable. In FIG. 10, the listings of files 1002 and 1006 are formed from a small and thin font because those files have usage metadata indicating minimal or less than average use. At the same time, the listings of files 1003 and 1004 are formed from an average sized font because those files have usage metadata reflecting average use.

In some embodiments, the file that the cursor is on can always be of full size and thickness regardless of that file's usage metadata. For example, as illustrated in FIG. 10, file 1005 may be rarely used but its listing is still clearly visible because the cursor is on that listing. This arrangement can allow a user to easily read the listing that the cursor is on and, therefore, help the user find and select a particular media file listing. In some embodiments, the listing that the cursor is on may be adjusted to be more noticeable (e.g., formed from a large and thick font) in order to further aid a user in reading the selected listing.

In some embodiments, an electronic device can adjust the graphical representations of less used media files to the point where they are no longer detectable by the user. For example, the listing may be formed from a font that is so small that a user can't see the graphical representation. In such a case, the electronic device may simply remove the file from the list of available media files. In some embodiments, the electronic device may even delete the file from its storage.

Figure 11:
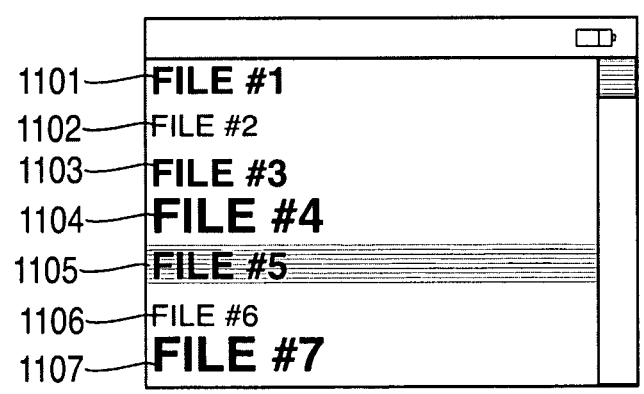
FIG. 11 shows a schematic view of another illustrative display screen for adjusting graphical representations of media files based on usage metadata in accordance with an embodiment of the present invention.

FIG. 11 shows a schematic view of an illustrative display screen for displaying graphical representations of media files in accordance with an embodiment of the present invention. FIG. 11 is substantially similar to FIG. 10 with the primary difference being that the graphical representations of more commonly used (e.g., used more than average) media files have been adjusted to be more noticeable in FIG. 11. Accordingly, the description of display screen 1000 in FIG. 10 can be applied to display screen 1100 in FIG. 11. Display screen 1100 is showing graphical representations of media files where the listings of less commonly used files have been adjusted to be less noticeable and the listings of more commonly used files have been adjusted to be more noticeable.

In display screen 1100, the listings of files 1102 and 1106 are formed from a small and thin font because those files have usage metadata indicating minimal use, while the listings of files 1101 and 1103 are formed from an average sized font because those files have usage metadata reflecting average use. Additionally, the listings of files 1104 and 1107 have large fonts because those files have usage metadata reflecting heavy use. In this manner, it is easier for a user to locate and select media files that are regularly used. Like the listing of file 1005 in FIG. 10, the listing of file 1105 is an average size, regardless of usage metadata, because the cursor is on that listing. In some embodiments, the listing that the cursor is on may be formed from the largest font used in the display such that the selected listing is as noticeable as the listing of the most commonly used file. In other embodiments, the listing that the cursor is on may be formed from a font that is larger than any other font used in the display such that the selected listing is more noticeable than the listing of the most commonly used file.

In some embodiments, the color of a file's graphical representation may also be adjusted based on usage metadata. For example, a listing for a media file that is not commonly used may be a light gray while a listing for a media file that is used often may be a dark black color. In some embodiments, graphical representations of media files that are used often may be a bright color (e.g., red or orange) in order to attract a user's attention to those files.

In accordance with the present invention, the graphical representations of media files can be adjusted in one or more ways to make each representation more or less noticeable. For example, the graphical representations may be adjusted by changing font type, font size, font color, location of representation on screen, three-dimensional effects on font or any other adjustment that can be used to make a graphical representation more or less noticeable. In some embodiments, a user may be able to manually adjust the graphical representations of media files regardless of usage metadata. For example, a user may be able to manually adjust the graphical representations of his favorite media files such that those files are easy to find.

While display screen 1000 and display screen 1100 show graphical representations of media files as listings, graphical representations of media files can also be graphical images without deviating from the spirit and scope of the present invention. For example, images representing media files or media file playlists (e.g., albums) may be presented to a user for selecting a media file or a media file playlist. In accordance with an embodiment of the present invention, the appearance of such images may be adjusted based on usage metadata. For example, images representing less used media files or playlists may be adjusted to be less noticeable than images representing more commonly used media files or playlists. In some embodiments, images representing less used media files or playlists may be made smaller or more blurry than images representing more commonly used media files or playlists. Accordingly, a user can more easily find and select commonly used media files or playlists based on the adjusted image representations.

In accordance with an embodiment of the present invention, graphical representations of some media files may not be displayed if the files are rarely used. For example, after the representation of a media file has been shrunk several times, removing the representation from the display may be the next step to make it less noticeable. In some embodiments, the media file may be automatically deleted when its graphical representation has been automatically removed from a display. In other embodiments, the media file may remain on the electronic device after its graphical representation has been automatically removed from a display. In such embodiments, a user may be able to review files that have been automatically removed from a display and either restore them to the display or permanently delete them. A user may have the option to permanently delete all of these media files with one command after reviewing the list.

Figure 12:
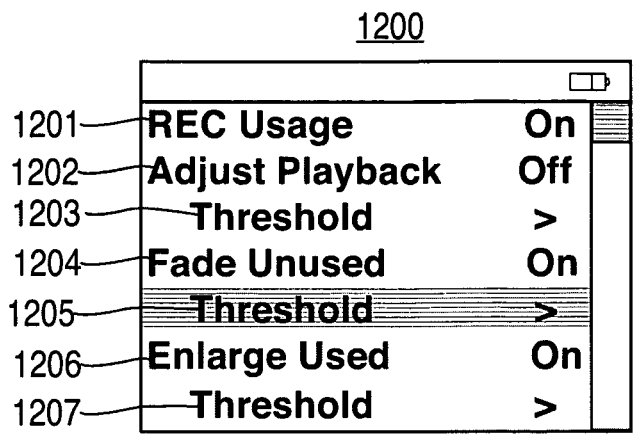
FIG. 12 shows a schematic view of an illustrative display screen for configuring an electronic device in accordance with an embodiment of the present invention.

FIG. 12 shows a schematic view of an illustrative display screen for configuring an electronic device in accordance with an embodiment of the present invention. An electronic device may present a user with display screen 1200 such that the user can configure how the device adjusts playback of media files or graphical representations of media files based on usage metadata. Display screen 1200 may also allow a user to adjust how the electronic device monitors playback and stores usage metadata. Display screen 1200 can include option 1201 which a user can select to instruct an electronic device to record usage metadata. If a user selects option 1201, the option can toggle between "off" and "on" such that a user can prevent an electronic device from recording usage metadata if he wishes to do so. Display screen 1200 can include option 1202 which a user can select to instruct an electronic device to adjust playback based on usage metadata. If a user selects option 1202, the option can toggle between "off" and "on" such that a user can prevent an electronic device from adjusting playback based on usage metadata if he wishes to do so. Display screen 1200 can include option 1203 which a user can select to set the threshold for adjusting playback based on metadata. In some embodiments, a user may be presented with a new screen for setting thresholds if option 1203 is selected (see, e.g., display screen 1400 of FIG. 14). Display screen 1200 can include option 1204 which a user can select to instruct an electronic device to fade (e.g., make less noticeable) the graphical representations of unused media files. If a user selects option 1204, the option can toggle between "off" and "on" such that a user can prevent an electronic device from fading the graphical representations of unused media files if he wishes to do so. Display screen 1200 can include option 1205 which a user can select to set the threshold for fading graphical representations. For example, a user may set the threshold so that graphical representations fade after the media file hasn't been played for a certain amount of time (e.g., one month). In another example, a user may set the threshold so that graphical representations fade after the media file hasn't been played for a certain number of other play counts (e.g., other media files have been played 1,000 times). In some embodiments, a user may simply set the threshold as a relative point on a sliding scale between "low" and "high" such that a user is unbothered by the statistical data used to activate the threshold but can still set the relative level of the threshold. An example of such an option screen is discussed below in connection with FIG. 14. Like option 1203, a user may be presented with a new screen for setting thresholds if option 1205 is selected. Display screen 1200 can include option 1206 which a user can select to instruct an electronic device to enlarge (e.g., make more noticeable) the graphical representations of commonly used media files. If a user selects option 1206, the option can toggle between "off" and "on" such that a user can prevent an electronic device from enlarging the graphical representations of commonly used media files if he wishes to do so. Display screen 1200 can include option 1207 which a user can select to set the threshold for enlarging graphical representations. Like option 1203, a user may be presented with a new screen for setting thresholds if option 1207 is selected.

Figure 13:
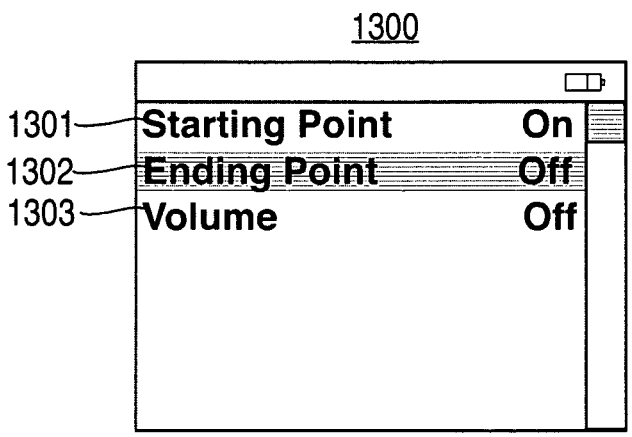
FIG. 13 shows a schematic view of another illustrative display screen for configuring an electronic device in accordance with an embodiment of the present invention.

FIG. 13 shows a schematic view of an illustrative display screen for configuring an electronic device in accordance with an embodiment of the present invention. An electronic device may present a user with display screen 1300 such that the user can configure how the device adjusts playback of media files. In some embodiments, an electronic device may present a user with display screen 1300 after the user sets option 1202 on display screen 1200 to "on." In other embodiments, a user may be able to directly access display screen 1300. Display screen 1300 can include detailed options for the types of playback adjustment that a user can configure. Display screen 1300 can include option 1301 which a user can select to instruct an electronic device to adjust the starting point of playback based on usage metadata. Display screen 1300 can include option 1302 which a user can select to instruct an electronic device to adjust the ending point of playback based on usage metadata. Display screen 1300 can include option 1303 which a user can select to instruct an electronic device to adjust the volume of playback based on usage metadata. It is understood that display screen 1300 can include additional options for adjusting the playback of media files based on usage metadata without deviating from the spirit and scope of the present invention.

Figure 14:
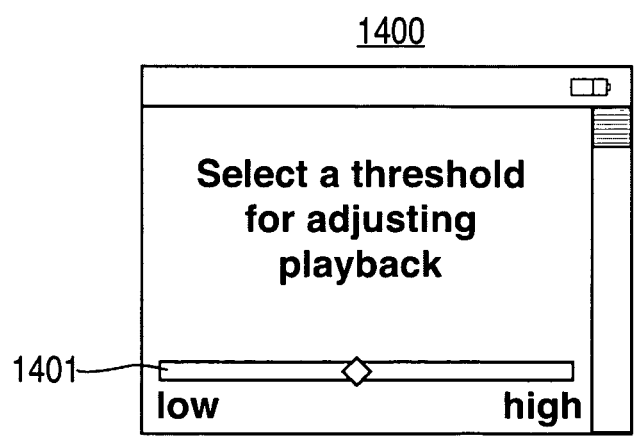
FIG. 14 shows a schematic view of another illustrative display screen for configuring an electronic device in accordance with an embodiment of the present invention.

FIG. 14 shows a schematic view of an illustrative display screen for configuring an electronic device in accordance with an embodiment of the present invention. An electronic device may present a user with display screen 1400 such that the user can configure the threshold that the device uses when adjusting playback. In some embodiments, an electronic device may present a user with display screen 1400 after the user selects option 1203, 1205 or 1207 on display screen 1200. In other embodiments, a user may be able to directly access display screen 1400. Display screen 1400 can include a slider bar 1401 such that a user can set the threshold for adjusting playback at a value on a continuum between "high" and "low." For example, if a user sets the threshold at "high," an electronic device may not adjust playback of a media file unless the usage metadata indicates a consistent pattern of a user manually adjusting playback of that media file. In the alternative example, if a user sets the threshold at "low," an electronic device may freely adjust playback of a media file if there is any usage metadata indicating a user preference for playback of that media file. As previously mentioned, slider bar 1401 can allow a user to set the threshold at any point along the continuum between "low" and "high." As shown in FIG. 14, threshold slider bar 1401 is currently set roughly 75% of the way between "low" and high." In some embodiments, a user can explicitly enter a numerical value rather than adjusting a slider bar. For example, a user may be able to set the threshold to 3 such that playback is adjusted after 3 instances of playback show a consistent pattern.

It is understood that a variation of display screen 1400 can be presented to a user to set thresholds for other adjustments. For example, a user may be presented with a variation of display screen 1400 for adjusting the threshold for fading graphical representations after the user selects option 1205 from FIG. 12. In another example, a user may be presented with a variation of display screen 1400 for adjusting the threshold for enlarging graphical representation after the user selects option 1207 from FIG. 12.

Figure 15:
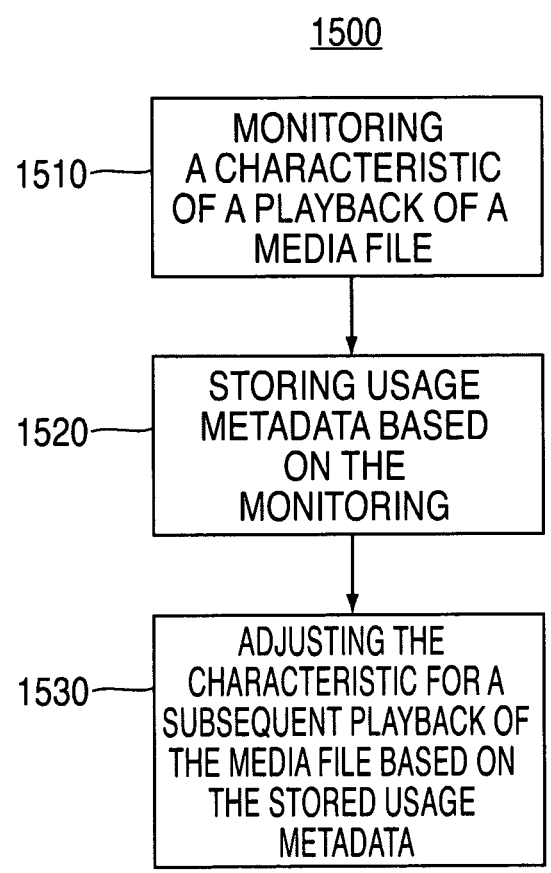
FIG. 15 shows a flowchart of an exemplary method of adjusting a characteristic of a playback based on usage metadata in accordance with an embodiment of the present invention.

FIG. 15 is a flowchart of an illustrative process for adjusting a characteristic of media file playback in accordance with an embodiment of the present invention. Process 1500 can be performed by an electronic device (e.g., device 100, device 200 or device 300). At step 1510, a characteristic of a playback of a media file can be monitored. The processor (e.g., processor 302) or any other circuitry in an electronic device can perform the monitoring. The monitoring may include monitoring, among other characteristics, the starting point of the playback, the ending point of the playback, the volume of the playback, the equalizer setting of the playback or some combination thereof. In some embodiments, the monitoring may include identifying when a user changes a characteristic during playback. In other words, the monitoring may include ignoring characteristics that aren't changed by a user during playback. For example, if a device is monitoring the volume of playback, it may only record when a user changes the volume during playback. In such embodiments, the monitoring may be able to specifically identify when the characteristic of playback is indicative of a user's preference and not the default characteristic.

In some embodiments, the monitoring can include monitoring visual characteristics of media file playback. For example, if a video or a slide show of digital images is played, the monitoring can include monitoring if the visual component of the media file was displayed through an external device (e.g., an external device connected through a "TV Out" plug). In some embodiments, the visual characteristics can include the properties of video playback, such as the resolution (e.g., standard or high-definition), the format (e.g., NTSC or digital) or the aspect ratio (e.g., standard 4:3 or widescreen 16:9). In some embodiments, the visual characteristics may also include whether or not captions or subtitles were displayed during video playback.

At step 1520, usage metadata is stored based on the monitoring. The processor of an electronic device (e.g., processor 302) may store the usage metadata in the device's storage (e.g., storage 304). The usage metadata may be related only to the one or more characteristics that were being monitored. In some embodiments, the processor can compute new usage metadata based on previously stored usage metadata and the results of the monitoring and then store the new usage metadata. Computing such new usage metadata can include averaging the previously stored usage metadata with results from the monitoring.

Figure 16:
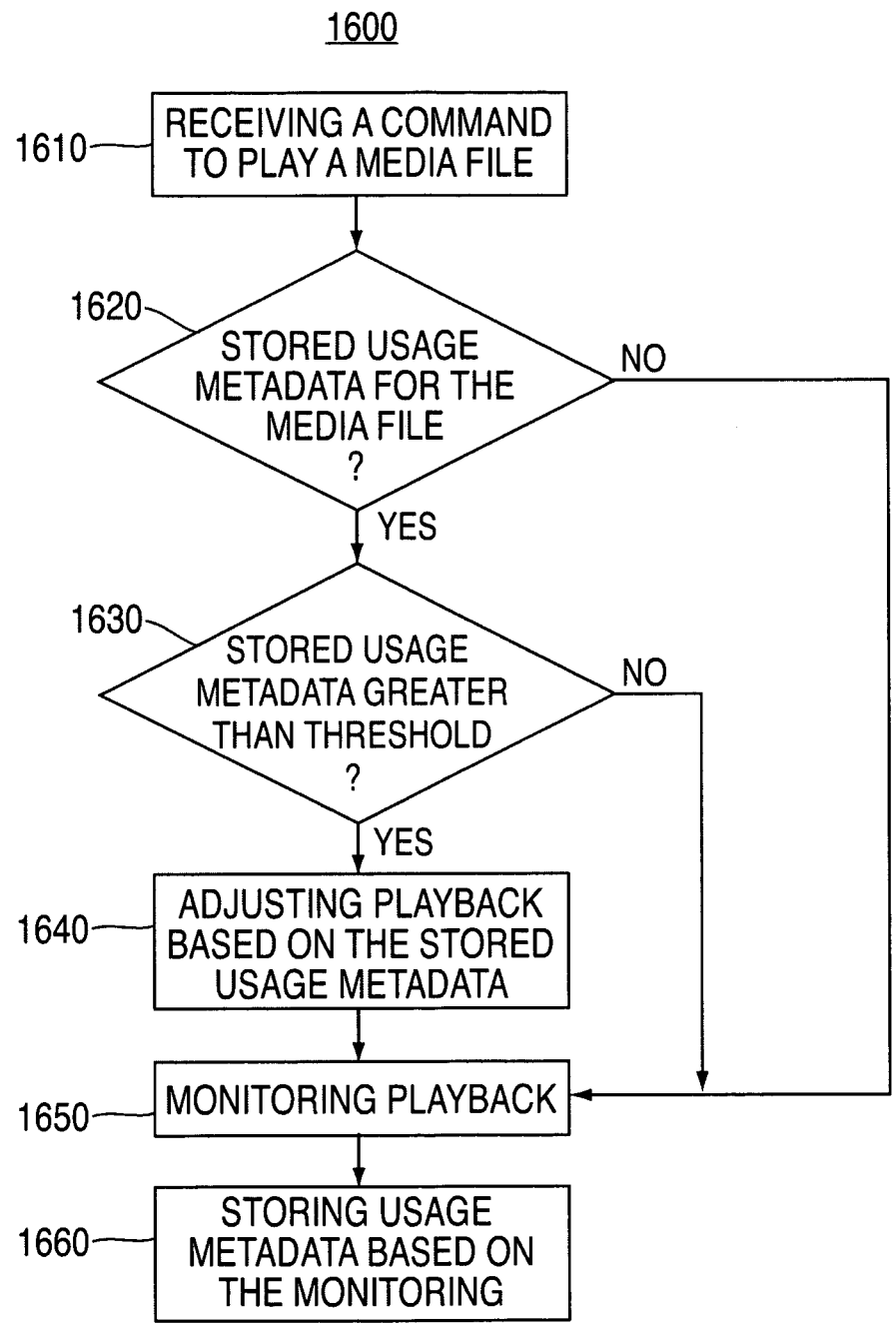
FIG. 16 shows a flowchart of another exemplary method of adjusting a characteristic of a playback based on usage metadata in accordance with an embodiment of the present invention.

At step 1530, the characteristic for a subsequent playback of the media file may be adjusted based on the stored usage metadata. The processor of an electronic device (e.g., processor 302) or any other circuitry in an electronic device may adjust the characteristic for a subsequent playback. For example, FIG. 16 is a flowchart of an illustrative process for adjusting playback of a media file in accordance with an embodiment of the present invention. Process 1600 can be used in an electronic device (e.g., device 300) where there is no history of usage metadata for one or more media files. For example, process 1600 allows a device to bypass the adjusting step if there is no usage metadata for a media file. Process 1600 also allows a device to bypass the adjusting step if the usage metadata is not sufficient to overcome a threshold.

At step 1610, an electronic device can receive a command to play a media file. At step 1620, a device determines whether there is stored usage metadata for the media file that has been selected. For example, if the media file has never been previously played, there may be no stored usage metadata for that file. If there is no usage metadata, process 1600 jumps to step 1650. However, process 1600 proceeds with step 1630 if there is stored usage metadata. At step 1630, the device determines if the stored usage metadata is greater than the threshold for adjusting playback. For example, a threshold may be set (e.g., using display screen 1400) such that an electronic device will not adjust playback unless the usage metadata is above a threshold. Such a threshold can prevent an electronic device from adjusting playback when there isn't a consistent pattern indicating the user's playback preference. If the stored usage metadata does not meet the threshold, process 1600 jumps to step 1650. However, process 1600 proceeds with step 1640 if there is stored usage metadata greater than the threshold. It is understood that decision step 1620 and decision step 1630 can be combined into a single decision step without deviating from the spirit and scope of the present invention. However, the two decision steps were separated in FIG. 16 for the sake of illustration.

At step 1640, playback is adjusted based on the stored usage metadata. The adjustment that occurs in step 1640 is similar to the adjustment that occurs at step 1530 of process 1500. For example, the adjustment may be performed by the electronic device's processor (e.g., processor 302). The adjustment may involve adjusting one or more characteristics (e.g., starting point, ending point, volume, etc.) of the playback. At step 1640, the electronic device may display a notification (e.g., display screen 900) to a user to indicate that playback is being adjusted. In some embodiments, the user may have an option to cancel the adjustment at this point. At step 1650, the electronic device monitors the playback. Such monitoring may include monitoring one or more characteristics of the playback. Such monitoring may include monitoring only user initiated changes to the playback. For example, the device may only monitor if the user manually changes the volume because that is a reasonably reliable indication of user preference. At step 1660, the electronic device may store usage metadata based on the monitoring. For example, the device may store new usage metadata based on the results of monitoring the playback. In some embodiments, the electronic device may combine the results of monitoring the playback with previously stored usage metadata such that the new usage metadata reflects the previous use.

Figure 17:
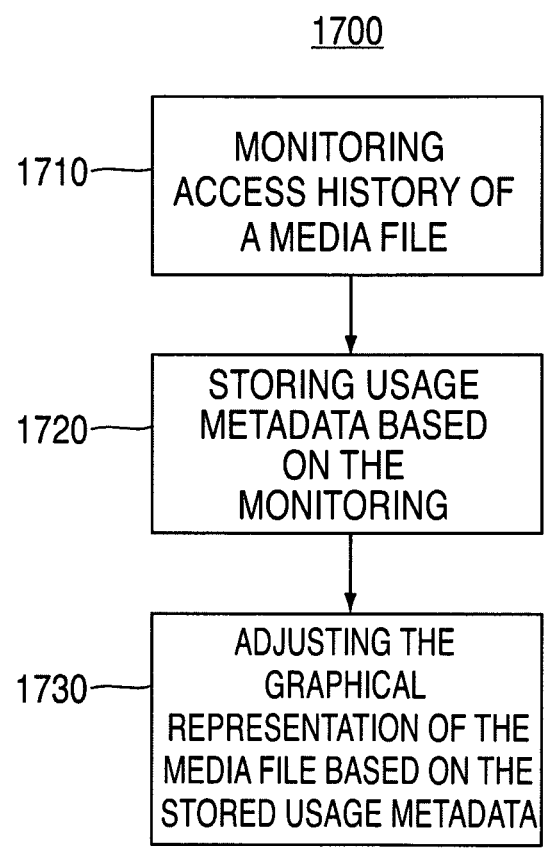
FIG. 17 shows a flowchart of an exemplary method of adjusting a graphical representation of a media file based on usage metadata in accordance with an embodiment of the present invention.

FIG. 17 is a flowchart of an illustrative process for adjusting a graphical representation of a media file in accordance with an embodiment of the present invention. Process 1700 can be performed by an electronic device (e.g., device 100, device 200 or device 300). At step 1710, the access history of a media file can be monitored. The processor (e.g., processor 302) or any other circuitry in an electronic device can perform the monitoring. The monitoring may include monitoring, among other measurements, the play count, the date and time the media file was last played, the frequency that the media file is played or some combination thereof. At step 1720, usage metadata is stored based on the monitoring. The stored usage metadata may include one or more measurements of access history. Usage metadata may be stored in the electronic devices storage (e.g., storage 304) or any other suitable storage device. In some embodiments, the electronic device may combine previously stored usage metadata with the results of the monitoring to generate new usage metadata. For example, previously stored usage metadata may be averaged with the results of the monitoring to generate new usage metadata. At step 1730, the graphical representation of the media file may be adjusted based on the stored usage metadata. The graphical representation may be adjusted to be more or less prominent or noticeable. For example, the graphical representation can be adjusted to be less noticeable if the stored usage metadata indicates that the media file is rarely used. On the other hand, the graphical representation can be adjusted to be more noticeable if the stored usage metadata indicates that the media file is commonly used. The adjusting may be performed by the electronic device's processor (e.g., processor 302) or any other suitable circuitry.

Thus it is seen that systems and methods are provided for adjusting playback and graphical representations of media files. One skilled in the art will appreciate that the invention can be practiced by other than the described embodiments, which are presented for purposes of illustration and not of limitation, and the present invention is limited only by the claims which follow.

What is claimed is:

1. A computer-implemented method, comprising:
    receiving, on a computing device, one or more media files, wherein a media file includes usage metadata corresponding to one or more playback characteristics of the media file;
    monitoring the one or more playback characteristics of the media file;
    determining changes to the one or more playback characteristics of the media file, wherein determining includes averaging the changes, and wherein the changes to the one or more playback characteristics of the media file includes skipping a section of the media file during the playback, adjusting a volume setting during the playback of the media file, or adjusting an equalizer setting during the playback of the media file;
    updating the usage metadata based upon the determined changes;
    adjusting the media file using the updated usage metadata, wherein adjusting includes changing the playback of the media file; and
    displaying a notification indicating that the playback of the media file has been adjusted according to the updated usage metadata.

2. The method of claim 1, wherein adjustments to the media files are pre-determined.

3. The method of claim 1, wherein the playback characteristics affect the playback of the media file.

4. The method of claim 1, wherein the usage metadata further corresponds to an access history of the media file, and wherein the media file is associated with a graphical representation.

5. The method of claim 4, further comprising:
    monitoring the access history of the media file, wherein monitoring includes determining a number of times the media file has been accessed for a threshold period of time;
    determining changes to the access history of the media file, wherein accessing the media file for a threshold period of time is a change to the usage metadata; and
    adjusting the media file, wherein adjusting includes changing the graphical representation of the media file.

6. The method of claim 5, wherein the graphical representation is a listing, and wherein adjusting the graphical representation includes changing the font size of the listing, changing the font intensity of the listing, or changing the font color of the listing.

7. The method of claim 5, wherein the graphical representation is an image, and wherein adjusting the graphical representation includes changing a three-dimensional rendering of the image, or changing a simulated depth of the image.

8. The method of claim 5, wherein the number of times the media file has been accessed affects the graphical representation.

9. A computer-implemented system, comprising:
    one or more data processors; and
    one or more non-transitory computer-readable storage media containing instructions configured to cause the one or more processors to perform operations including:
        receiving one or more media files, wherein a media file includes usage metadata corresponding to one or more playback characteristics of the media file;
        monitoring the one or more playback characteristics of the media file;
        determining changes to the one or more playback characteristics of the media file, wherein determining includes averaging the changes, and wherein the changes to the one or more playback characteristics of the media file includes skipping a section of the media file during the playback, adjusting a volume setting during the playback of the media file, or adjusting an equalizer setting during the playback of the media file;
        updating the usage metadata based upon the determined changes;
        adjusting the media file using the updated usage metadata, wherein adjusting includes changing the playback of the media file; and
        displaying a notification indicating that the playback of the media file has been adjusted according to the updated usage metadata.

10. The system of claim 9, wherein adjustments to the media files are pre-determined.

11. The system of claim 9, wherein the playback characteristics affect the playback of the media file.

12. The system of claim 9, wherein the usage metadata further corresponds to an access history of the media file, and wherein the media file is associated with a graphical representation.

13. The system of claim 12, further comprising instructions configured to cause the one or more processors to perform operations including:
    monitoring the access history of the media file, wherein monitoring includes determining a number of times the media file has been accessed for a threshold period of time;
    determining changes to the access history of the media file, wherein accessing the media file for a threshold period of time is a change to the usage metadata; and
    adjusting the media file, wherein adjusting includes changing the graphical representation of the media file.

14. The system of claim 13, wherein the graphical representation is a listing, and wherein adjusting the graphical representation includes changing the font size of the listing, changing the font intensity of the listing, or changing the font color of the listing.

15. The system of claim 13, wherein the graphical representation is an image, and wherein adjusting the graphical representation includes changing a three-dimensional rendering of the image, or changing a simulated depth of the image.

16. The system of claim 13, wherein the number of times the media file has been accessed affects the graphical representation.

17. A computer-program product, tangibly embodied in a non-transitory machine readable storage medium, including instructions configured to cause a data processing apparatus to:
    receive one or more media files, wherein a media file includes usage metadata corresponding to one or more playback characteristics of the media file;
    monitor the one or more playback characteristics of the media file;
    determine changes to the one or more playback characteristics of the media file, wherein determining includes averaging the changes, and wherein the changes to the one or more playback characteristics of the media file includes skipping a section of the media file during the playback, adjusting a volume setting during the playback of the media file, or adjusting an equalizer setting during the playback of the media file;
update the usage metadata based upon the determined changes;
adjust the media file using the updated usage metadata, wherein adjusting includes changing the playback of the media file; and
display a notification indicating that the playback of the media file has been adjusted according to the updated usage metadata.

18. The computer-program product of claim 17, wherein adjustments to the media files are pre-determined.

19. The computer-program product of claim 17, wherein the playback characteristics affect the playback of the media file.

20. The computer-program product of claim 17, wherein the usage metadata further corresponds to an access history of the media file, and wherein the media file is associated with a graphical representation.

21. The computer-program product of claim 20, further comprising instructions configured to cause the data processing apparatus to:
monitor the access history of the media file, wherein monitoring includes determining a number of times the media file has been accessed for a threshold period of time;
determine changes to the access history of the media file, wherein accessing the media file for a threshold period of time is a change to the usage metadata; and
adjust the media file, wherein adjusting includes changing the graphical representation of the media file.

22. The computer-program product of claim 21, wherein the graphical representation is a listing, and wherein adjusting the graphical representation includes changing the font size of the listing, changing the font intensity of the listing, or changing the font color of the listing.

23. The computer-program product of claim 21, wherein the graphical representation is an image, and wherein adjusting the graphical representation includes changing a three-dimensional rendering of the image, or changing a simulated depth of the image.

24. The computer-program product of claim 21, wherein the number of times the media file has been accessed affects the graphical representation.

* * * * *